Figure 1:
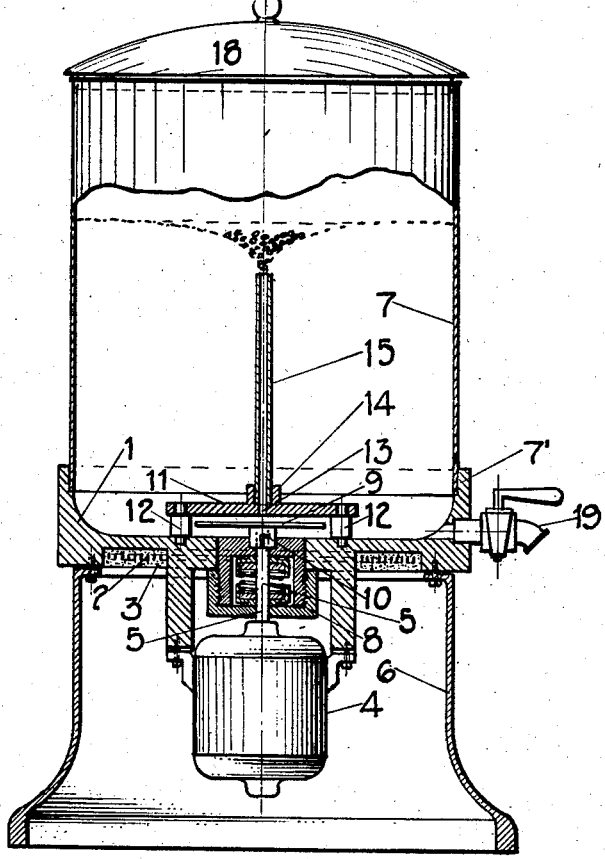

Feb. 9, 1937. R. L. GILBERT 2,070,545
EMULSIFICATION DEVICE
Filed Nov. 24, 1933

Inventor
Riley L. Gilbert

UNITED STATES PATENT OFFICE 2,070,545

EMULSIFICATION DEVICE

Riley L. Gilbert, Chicago, Ill., assignor to Riley L. Gilbert, L. L. Davis, Jr., and Arthur J. Ferguson, as trustees of a common law trust estate entitled The Gilbert Foundation, all of Chicago, Ill.

Application November 24, 1933, Serial No. 699,551

4 Claims. (Cl. 99—264)

My invention relates to an improved method of emulsification and functioning means therefor, wherein:

The method is characterized by the induction of a gaseous phase into and during the intimate working of two liquid phases, thereby accomplishing a peculiar disruptive and dispersive effect upon the said liquid phases; and The functioning device serving for the said emulsification comprises a base casting into which is cemented a heating element and serving as the lower portion of a container for the said liquid phases and for supporting a driving means; a container shell attached to said casting and forming the upper portion of the container; a disk capable of being driven at high speeds of rotation; a plate parallel to and co-acting with the said disk but not in direct contact therewith; a tube displaceably mounted in the said plate and serving to conduct the said liquid phases and the said gaseous phase from the free liquid surface to the center of the said disk; and connecting means between the said driving means and the said disk to accomplish rotation of the disk.

Other novel and characteristic features of the method and apparatus will be apparent from the reading of this specification and an analysis of the drawing appended hereto.

In particular, one object of my invention is to produce a highly stable emulsion of butter in milk; it being found economically desirable to furnish such a preparation to the public in view of the insufficiency of supply of natural cream, wide diversity in classification of the butterfat content of such cream, and the difficulty in maintaining natural cream in an unfermented state. Butter, which contains approximately eighty percent butterfat, is an oleaginous material melting at about 103° Fahrenheit, while milk with which the butter may be combined contains eight to ten percent casein, and varying quantities of other substances such as lactose, dissolved or suspended in the aqueous medium. In natural milk, the butterfat exists in microscopic particles, each surrounded by clusters of casein aggregate. Upon standing, these fat particles and the accompanying casein slowly rise to the surface and may be skimmed off or they may be separated from the remainder of the milk components by centrifugation. The cream thus produced must be subjected to a highly dispersive action at a temperature below the melting point of the butterfat to cause coalescence of the particles into butter. This disruptive effect breaks up the casein envelopes surrounding the individual fat particles, the fat coalescing into butter while the casein and other components of the cream form the buttermilk. In producing cream from milk and butter, it is impossible to duplicate the conditions characterizing natural cream in the finished product. No amount of churning, agitation, or other physical effect will re-form the casein aggregates around the butterfat particles and, to produce an artificial cream such as I contemplate, which will be stable over comparatively long periods of time; which will not feather when added to hot liquids, and which will simulate other essential characteristics of natural cream, it is necessary either to subdivide the butterfat emulsoid to a fineness of particle of less than one micron or to employ protective means other than the natural casein clusters or both to stabilize the emulsion.

I am aware that emulsoids, such as butterfat dispersed in milk, have in general been prepared by devices variously termed homogenizers, beaters, viscolizers and the like wherein, in general, the liquid phases to be emulsified in one another are forced under high pressure from nozzles at high velocity against plain or ribbed surfaces, the impact being used to shatter the particles of butterfat and even to subdivide the casein aggregates naturally occurring in milk and cream. The colloid mill is another familiar means employed for this purpose wherein the mixture of the liquid phases to be emulsified is caused to flow between parallel surfaces rotating at high speed in different directions and separated from each other by a few thousandths of an inch or less. Various modifications of these methods have been employed wherein the parallel plates have been fashioned in the form of disks, truncated cones, cylinders and the like, and in some instances only one surface has been rotated while the other surface has remained fixed, the force necessary to cause the liquid phases to pass through the intervening space being furnished by the viscous friction of the liquids and the centrifugal force of the rotating member or members. Likewise, a means has been employed for this purpose where a disk is caused to rotate near the bottom of a container in which are placed the liquid phases to be emulsified, the rotation of the said disk imparting a swirling motion to the surrounding liquid and causing the formation of a vortex therein, extending from the surface of the liquid down to a portion of the said disk. In this it is claimed that the lighter of the liquid phases will collect upon the surface of the liquid vortex so formed and will be drawn down this vortex, impinging upon the disk at the tip of the vortex and, having more of an affinity for the metal disk than does the aqueous phase, it will wet the surface of the disk and be impelled at high velocity along the disk surface and be thrown from the edge of the disk by centrifugal force into the surrounding medium in a highly divided manner. Other attempts have been made to accomplish this purpose by various modifications and combinations of portions of these basic principles, the most notable one being a combination of a disk rotating at high speed surrounded by a wall carrying ribs against which the liquid phases to be emulsified are thrown at high velocity by centrifugal force.

Where devices of the type of colloid mills having coactive surfaces separated by extremely small clearances are employed, there can be no question of fineness of subdivision of the disperse phase. The power consumed, however, by this method of dispersion is out of all proportion to the free surface energy of the products and for this reason the method does not lend itself to the simple low-power type of device contemplated in my invention. Furthermore, the skill demanded for the successful operation of such devices necessitates their supervision by those highly skilled in the art.

When, however, materials such as dairy products are subjected to the action of this type of mill, it has been found that the small clearance between the co-acting surfaces, high speeds of rotation, and violence of disruptive force resulting therefrom, not only accomplish dispersion, in the true sense of the term, but actually break down and disintegrate naturally occurring colloids, such as casein. This causes a substantial increase in the viscosity of the emulsion and/or dispersion, and affords the gelatinous, leathery consistency so objectionable to the consumer.

I have attempted to produce a satisfactory grade of artificial cream from milk and butter by all of the principles set forth above, but only with partial success in that few of the products so formed have shown the required degree of stability and lack of separation between the phases over a period of more than a few hours. While heavy machines consuming large amounts of energy have produced fairly satisfactory results, it is my purpose to provide a small, convenient and portable batch-emulsifying device which will consume relatively small amounts of energy and which will provide a product which will remain perfectly stable over long periods of time (from two to four days).

In particular, I have attempted to use the principle of the prior art employing the vortex principle of which has been outlined above. Attempts to employ it have failed, however, owing to the fact that, after a coarse mixture of butterfat and milk has been once formed, it is impossible for the butterfat globules to break through the films of the surrounding medium due to the interfacial tension of these films and to wet the surface of the disk and thus be more finely divided by centrifugal action. It is a well-known fact in the formation of emulsions that, when a disperse phase has been disseminated through a continuous phase, the taste, electrical conductivity, wetting ability, and other physical characteristics of the emulsion are substantially those of the continuous phase. When the disperse phase has been broken down into a sufficiently fine state of subdivision, the surface tension of the continuous phase at the interface between the two phases forms a more or less resilient skin around the disperse particles and prevents their coalescence. Long before the disperse phase has been reduced to a fineness of subdivision necessary for stability, the dispersed material is in sufficiently small globules to form a more or less tough film around the same and prevent them from breaking through and wetting the metal surface.

Since the interfacial tension in an emulsion is by itself not sufficient to prevent the gradual separation of the phases and ultimate coalescence of the emulsoid, it has been found advantageous to provide a third material which collects at the interface and "armors" the nuclei. It is not necessary to discuss this effect since all those familiar with the wedge theory of protective colloids fully understand the action. It need only be mentioned here that emulsions of gases in liquids may be so armored with solid colloidal particles collecting at the interfaces while emulsions of one liquid phase in another are rendered highly stable by dissolving, in the emulsion, compounds, the larger ends of whose molecules are soluble in the continuous phase while the smaller ends are soluble in the emulsoid. Following this line of reasoning, I have, therefore, found a method for the stabilization of an emulsion of butter in milk which is rendered highly stable by the induction during emulsification of a relatively small quantity of a gas, such as air, into the material while it is being subjected to a highly disruptive force. It has been impossible to determine whether the fat globules are stabilized by concentration of sub-microscopic bubbles of air at the interfaces between the fat and the milk or whether extremely small bubbles of air are stabilized by the accumulation of fat particles at the interfaces between the air and the milk. Again, it may be assumed that the intermittent injection of air between the co-acting surfaces within the region where the emulsion is being formed has the physical effect of "blasting" these surfaces with consequent disintegration of the particles of fat. Whatever the reason, I have found cream produced by such an action to exceed all other products of similar nature in stability, smoothness, and simulation of natural properties.

A better understanding of my method may be gained from an inspection of Figure 1, showing a diagrammatic representation of the device which I have found suitable for my purpose, wherein 1 represents a heavy base casting having a heating element 2 suitably disposed in a groove 3 provided therein. 4 represents a motor mounted upon and below casting 1 in a conventional manner with the rotor axis 5 projecting vertically upward through the center of the casting. 6 is a housing secured to the said casting and providing a support therefor. The upper portion of casting 1 is fashioned with rounded corners to form the bottom of a container, the sides of which are formed by a cylindrical metal sheet 7 soldered or otherwise attached within a shoulder 7' joined to the rim of casting 1 in such a manner that the cylinder and casting form a smooth inner surface. Lid 18 is provided as a cover for this container, while spigot 19 is located at a suitable point near the bottom for convenient discharge therefrom. Motor shaft 5 is carried through the center of casting 1, and is provided with a stuffing-box 8, or other sealing means to allow rotation of the said shaft and at the same time to prevent passage of liquid from the interior of the container downward through the opening. In practice, a Cooke oil seal has been found to be very advantageous in permitting rotation of shaft 5, and at the same time preventing downward flow of the liquid while simultaneously a metal surface is exposed to the liquid within the container which cannot contaminate the contents. Disk 9 is provided substantially as shown with a shoulder 10 upon its lower surface at the center designed to fit over the end of the rotor shaft 5 and to lock thereupon. This seating and locking action may be performed in a variety of ways, but I prefer to fashion within the shoulder 10 an L-shaped groove into which engages a pin (not shown) at the side and near the end of shaft 5. Disk 9 is made of stainless steel and the upper end of the Cooke seal 8 is recessed to receive shoulder 10 of the disk. This assembly forms an extremely short coupling of motor 4 to disk 9, and provides a very true rotation of the disk without tendency to wobble. In this connection, the Cooke seal serves only as a seal and not as a radial thrust bearing, the radial and vertical thrusts of axis 5 being assumed by the motor bearings. Parallel to and separated by a space of a few hundredths of an inch from disk 9 is a fixed plate 11, roughly circular in form and somewhat larger than disk 9. This plate rests upon spacer pins 12, set into casting 1, the said spacer pins being provided with shoulders a short distance from their upper ends which serve to hold plate 11 in a permanently fixed position relative to disk 9. Plate 11 has a hole 13 drilled at its center, coinciding with the center of disk 9, and is provided with a vertically elongated collar 14 surrounding the hole 13. This collar 14 is somewhat larger than hole 13 to provide a shoulder at the upper surface of plate 11, the assembly being so designed as to permit the easy insertion of tube 15 within the collar, the said tube extending from the upper surface of plate 11 to a position slightly below the free surface of the liquids to be emulsified. Various lengths of tube 15 may be inserted in collar 14, corresponding to the size of the batch to be emulsified in any instance.

Since my purpose is to provide a device suitable for the emulsification of butter in milk, and since butter melts at a temperature somewhat above normal, it is essential that the temperature of the milk and butter be elevated to a point above the melting point of butter—103° Fahrenheit. Superheating of the charge is to be avoided, however, because of the danger of scorching or otherwise injuring the flavor of the milk and/or butter. To this end, thermostat 16 has been provided in a hermetically sealed housing in casting 1, sufficiently distant from heating element 2 as not to be affected by the superheating thereof. In addition, a time switch (not shown) has been provided suitably disposed on housing 6 to govern the length of time desired for emulsification.

Unlike apparently similar devices with extremely small clearances between their co-acting surfaces (colloid mill) stator 11 and disk 9 are separated by distances of the order of magnitude of hundredths of an inch rather than by thousandths of an inch. If too widely separated, the device performs more nearly as a centrifugal pump, drawing excessive quantities of the liquid phases and of air down tube 15 and projecting them radially outward. Poor disruptive action is thus afforded and little more than mixing results. On the other hand, if the said clearance is of too low an order of magnitude, the consumption of power becomes excessive, owing to the high viscous friction between the co-acting surfaces. I have discovered the optimum clearance with a 3" diameter disk rotating at 12,000 R. P. M. to be in general between 0.01 and 0.03 inch, thus providing a region of highly disruptive force and producing intensive emulsifying action with the consumption of a minimum of energy. The novel effect so produced I ascribe to the intense dispersive action between the co-acting surfaces coupled with the effect of an intermittent induction of air thereinto. As is shown below, this air is inducted intermittently in the form of bubbles, a series or train of bubbles being drawn into the emulsifying region in sequence with momentary cessation of air supply between each bubble. This accomplishes the intermittent induction of air referred to above to which I ascribe the success of my method of emulsification.

Figure 2:
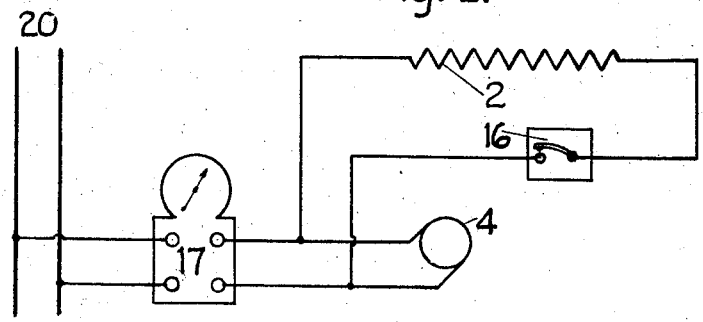

As shown in the circuit diagram in Figure 2, the heating element 2 is connected as a shunt to the driving circuit of the motor 4, the thermostat 16 being placed in series with the shunt circuit of the heating element 2, while the time switch 17 is interposed in the main circuit feeding both motor 4 and element 2.

In producing an emulsification of butter and milk, the procedure is substantially as follows:

The desired quantities of milk and butter are placed within the container formed by base 1 and cylinder 7, and the switch turned to the time position desired. Immediately disk 9 is rotated by motor 4, while at the same time the heating element 2 is energized and gradually brings the milk and butter to the desired temperature. Disk 9, due to the viscous friction between itself and the milk, draws the liquid milk from the surface downward through tube 15 and expels the milk peripherally outward. At the same time, a vortex is gradually formed extending from the free liquid surface to the top of tube 15, and air is inducted through the said tube simultaneously with the milk. As the mixed liquid and gaseous phases are expelled peripherally from the disk, a foam is soon formed which rises to the free liquid surface and fills the said vortex. From this time on, the air contained as an emulsion within the milk continues to circulate substantially as a closed system, the bubbles so filling the vortex being reinducted into tube 15 and serving for the intermittent feeding of air described above. Upon approaching the melting point temperature of the butter, the latter begins to fuse and is carried upward toward the surface and downward through tube 15 with the milk. Upon reaching the desired temperature, thermostat 16 interrupts the heating circuit and thence continues to snap on and off to maintain the temperature of the charge within the desired limits. Upon melting of the butter, a mixture of the two phases (milk and butter), together with bubbles of air, is drawn downward through the tube and expelled through the space between disk 9 and plate 11. Since this space is very narrow and the motor is designed to drive the disk at a high speed, it is evident that the mixed phases will be thrown at high velocity from the center to the periphery of the disk and that air inducted downward through the tube coincidentally with the mixture of butter and milk will also be expelled radially through the said space. This air, being fed intermittently, provides a series of blasting effects upon the surfaces of disk 9 and plate 11, and tends to scour these surfaces free from coatings of butter formed thereon. The intermittent expulsion at high velocity of the air also acts as a shattering force upon the particles of milk and butter contiguous thereto and provides an emulsoid of butterfat in a continuous phase of milk which is highly stable and possesses all of the desirable characteristics of natural cream.

It will be observed that plate 11 may be removed in an instant from its position of rest on pins 12 while disk 9 can be separated from motor shaft 5 with little trouble, thus providing an interior which is easily scalded or otherwise cleansed from traces of organic matter. Likewise, plate 11 serves as a shield for disk 9 and prevents intermittent contact of solid butter suspended in the milk with disk 9, while the said disk is rotating at high speed. This is essential since otherwise disk 9 might be thrown off balance by such contact and cause undue strain upon shaft and bearings.

With a disk of three inches diameter, a motor speed of 12,000 R. P. M., clearance between disk 9 and plate 11 of 0.03 inch, a tube having an inside diameter of 0.25 inch, and a charge of two gallons of milk with the desired quantity of butter, a highly stable emulsoid can be produced within 30 to 45 minutes from the time of snapping on switch 17, depending upon the temperature of the environment and the initial temperature of the milk.

While I have described my invention and represented it diagrammatically with reference to emulsification of butter in milk, I do not wish to be limited to this particular purpose nor to the exact design of equipment shown. Obviously, the dimensions, speeds, periods of time, and characteristics of materials may be varied without departing from either the principle or spirit of the method and apparatus associated therewith.

What I claim is:

1. A device for emulsifying immiscible fluids including liquids which comprises a vessel for containing the said liquids, a rotor disk in said vessel in position to lie beneath the surface of said liquids, said rotor disk being peripherally exposed to liquid in said vessel, a stator having a surface encompassing the area of said rotor disk with a small intervening separating circular space, said stator having a hole therein, a tube communicating by one end with said hole and extending upwardly in the vessel to a point below the level of liquid in the vessel, and means to drive the rotor at high speed, whereby liquid in the vessel is caused to swirl forming a vortex extending to the upper end of said tube for admitting air and liquid into the tube for passage through the space at the rotor disk.

2. A device for mixing comprising a vessel for containing liquid, a rotatable shaft extending into said vessel below the normal liquid level thereof, a rotor disk on the end of said shaft below the normal liquid level, a stator located in the vessel below the normal liquid level and beyond said shaft and disk, said stator having a surface close to, but separated by a small space, from the surface of the free end of said rotor disk, said stator being provided with an opening substantially at the center of said disk, and a selectable tube insertable into said hole providing a communication from said stator to a point near the level of the liquid when the device is in action whereby to cause said tube to suck in both liquid and air or gas above said liquid.

3. A device for emulsifying immiscible fluids including liquids which comprises a vessel for containing the said liquids, a rotor disk in said vessel in position to lie beneath the surface of said liquids, said rotor disk being peripherally exposed to liquid in said vessel, a stator having a surface encompassing the area of said rotor disk with a small intervening separating circular space, said stator having a hole therein, a tube communicating by one end with said hole and extending upwardly in the vessel through liquid therein, and means to drive the rotor at high speed, said tube having opening means therein adapted upon swirling of the liquid as a result of driving said rotor, to draw into the tube both liquid in the vessel and air above said liquid for passage into the space between the rotor and the stator.

4. A device for emulsification comprising a container formed by the section of a cylinder and a heavy base casting, a heating element for heating the said casting, a demountable disk within the said container capable of high speeds of rotation, a motor in cooperative relationship with the said disk for producing rotation thereof, a stator providing a surface parallel and closely adjacent to the surface of said disk, a tube displaceably mounted at the center of the said stator, said tube communicating through a hole in said stator with the space between the disk and said stator, and means for controlling the limits of temperature between which the contents of the said container may be maintained.

RILEY L. GILBERT.